United States Patent Office 3,532,710
Patented Oct. 6, 1970

3,532,710
SUBSTITUTED BENZOFURANS
Harmander Pal Singh Chawla, Pyara Krishen Grover, Nitya Anand, Ved Prakash Kamboj, and Amiya Bhuson Kar, all of Central Drug Research Institute, Lucknow, India
No Drawing. Filed Nov. 9, 1967, Ser. No. 681,913
Int. Cl. C07d 27/04, 5/32
U.S. Cl. 260—326.5           3 Claims

ABSTRACT OF THE DISCLOSURE

This invention is directed to 2,3-diphenyl-substituted 6,7-dihydro-5H-indeno[5,6-b]-, 5,6,7,8 - tetrahydro-naphtho[2,3-b]- and 6,7,8,9-tetrahydro-5H-cylohepta[f]benzofurans wherein the phenyl group at the 3-position bears a heteroamino-lower alkoxy substituent. Such compounds have significant pharmacological activity in preventing implantation of fertilized ova and thus possess activity as anti-fertility agents.

This invention relates to compositions of matter classified in the art of chemistry as substituted benzofurans.

The invention sought to be patented is described as residing in the concept of a chemical compound having a molecular structure wherein the 5 and 6 carbon atoms of the 2,3-diphenyl benzofuran have been linked by an alkylene bridge containing from 3 to 5 carbon atoms, and wherein there is attached to the para-position of the phenyl radical at the 3-position a pyrrolidino-lower alkoxy radical, and to the hereinafter described equivalents thereof.

As used throughout the specification and in the claims the terms "lower alkyl" and "lower alkoxy" embrace both straight and branched chain alkyl and alkoxy radicals respectively, containing from 1 to 6 carbon atoms, for example, but without limitation methyl, ethyl, n-propyl, isopropyl, n-butyl, tert-butyl, n-amyl, sec-amyl, n-hexyl, 2-ethyl butyl, 2,3-dimethylbutyl and the like in the case of "lower alkyl" and methoxy, ethoxy, n-propoxy, isopropoxy, n-butoxy, tert-butoxy, n-amyloxy, sec-amyloxy, n-hexyloxy, 2-ethylbutoxy, 2,3-dimethylbutoxy and the like in case of "lower alkoxy."

The tangible embodiments of this invention in the form of the acid-addition salts thereof possess the inherent general physical characteristics of being solid crystalline materials. Analytical data, including melting point and elemental composition, taken together with the aforementioned physical properties, the nature of the starting materials and the mode of synthesis, positively confirm the structure of the compounds sought to be patented.

The tangible embodiments of this invention, in its final product composition aspect, possess the inherent applied use characteristics of having significant pharmacological activity, without adverse toxicity, as anti-fertility agents as determined by pharmacological test procedures. Oral administration to female rats after mating to males of proven fertility showed an absence of implantation of any fertilized ova in the uterine horns.

The manner and process of making and using the invention will now be generally described so as to enable one skilled in the art of chemistry to make and use the same as follows.

The reaction sequence leading to the preparation of the tangible embodiments of this invention is set forth as follows:

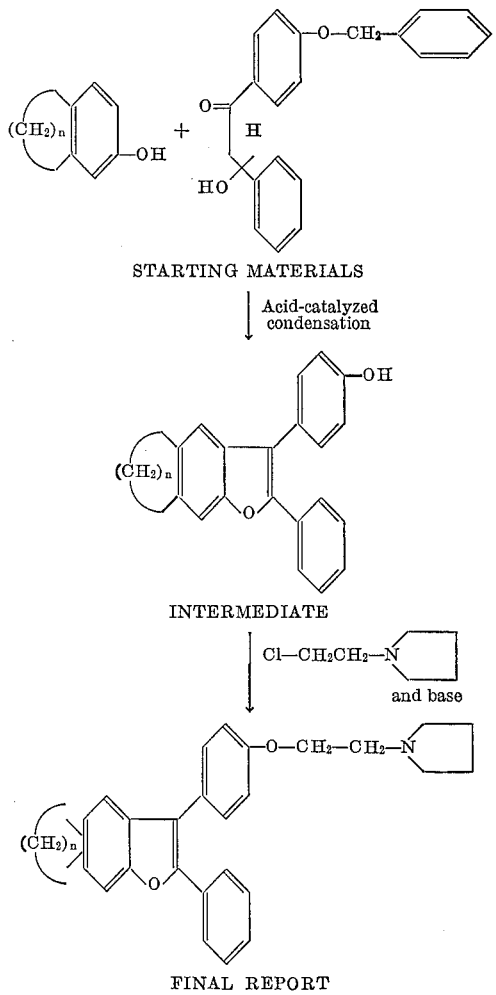

wherein $n$ is 1, 2 or 3.

In preparing the specific 2-phenyl-3-[p-(2-pyrrolidinoethoxyphenyl)] - 5,6,7,8-tetrahydro-naphtho[2,3-b]furan final product according to the above-depicted reaction sequence, the 5,6,7,8-tetrahydro-2-naphthol ($n=2$) and 4-benzyloxybenzoin starting materials are subjected to an acid catalyzed condensation reaction to form the 3-(p-hydroxyphenyl) - 2 - phenyl 5,6,7,8-tetrahydro-naphtho-[2,3-b]furan intermediate. The reaction is carried out at reflux temperature in the presence of an inert organic solvent such as, for example, dioxane, and in the presence of a sutiable acid catalyst, for example, a mineral acid such as hydrochloric acid. The reaction mixture is cooled and the intermediate obtained by conventional techniques of isolation and crystallization.

The 3 - (p-hydroxyphenyl)-2-phenyl-5,6,7,8-tetrahydro-naphtho[2,3-b]furan intermediate is then converted to the 2 - phenyl - 3-[p-(2-pyrrolidinoethoxyphenyl)]-5,6,7,8-tetrahydro-naphtho[2,3 - b]furan final product by treatment with pyrrolidinoethyl chloride, preferably in the form of its hydrochloride salt, in an inert organic solvent such as, for example, acetone, at reflux temperature and in the presence of a base such as, for example, potassium carbonate. The product of the reaction is then isolated and purified by conventional techniques.

The preparation of the tangible embodiments of this invention according to the above-depicted reaction sequence has been described using, as an example the preparation of the specific 2-phenyl-3-[p-(2-pyrrolidinoethoxyphenyl)] - 5,6,7,8-tetrahydro-naphtho-[2,3-b]furan final product wherein $n$ is 2. Starting materials also may be employed wherein $n$ is 1 or 3, such starting materials leading to intermediate and final product compositions wherein $n$ is the same as in the starting material. For example, 5-indanol ($n=1$) and 4-benzyloxybenzoin condense to form the 3-(p-hydroxyphenyl)-2-phenyl-6,7-dihydro-5H-indeno [5,6-b]furan intermediate which upon treatment with pyrrolidinoethyl chloride yields the 2 - phenyl-3-[p-(2-pyrrolidinoethoxyphenyl)] - 6,7-dihydro-5H-indeno[5,6-b]furan final product; and 5H - 6,7,8,9 - tetrahydro - 2-benzocycloheptenol ($n=3$) and 4-benzyloxybenzoin condense to form the 3-(p-hydroxyphenyl)-2-phenyl-6,7,8,9-tetrahydro - 5H-cyclohepta[f]benzofuran intermediate which upon treatment with pyrrolidinoethyl chloide yields the 2 - phenyl-3-[p-(2-pyrrolidinoethoxyphenyl)]-6,7,8,9-tetrahydro - 5H-cyclohepta[f]benzofuran final product. Such final products wherein $n$ is 1 or 3 are the full equivalents of the specific final products in the above-described reaction sequence wherein $n$ is 2.

Starting materials may also be employed wherein the benzenoid portion of the 5-indanol, 5,6,7,8-tetrahydro-2-naphthol or 5H-6,7,8,9 - tetrahydro-2-benzocycloheptenol, or one or both of the benzene rings of the 4-benzyloxybenzoin bear one or more lower alkyl, lower alkoxy, halogen or trifluoromethyl radicals. Their use in the above depicted reaction sequence yields intermediates and final products having lower alkyl, lower alkoxy, halogen or trifluoromethyl substitution on the benzene rings at same place as in the starting materials. Such final products are the full equivalents of the specific final products depicted hereinabove.

In addition, the use of other heteroamino-lower alkyl chlorie reactants, for example, pyrrolidino-lowe alkyl chlorides other than pyrrolidinoethyl chloride, piperidino-lower alkyl chloride, morpholino-lower alkyl chloride, N-lower alkyl-piperazino-lower alkyl chloride, or lower alkyl substittued derivatives thereof; or amino-lower alkyl chloride or the N-mono-lower alkyl or N,N-di-lower alkyl derivatives thereof, result in the preparation of final products in which a corresponding N-substituted lower alkoxy group is present, such compounds being the full equivalents of the specific final products described hereinabove.

The tangible embodiments of this invention can, if desired, be converted into their non-toxic pharmaceutically acceptable acid-addition and quaternary ammonium salts. Salts which may be formed comprise, for example salts with inorganic acids such as the hydrochloride, hydrobromide, hydroiodide, sulfate, phosphate or the like. They may also comprise salts with organic acids, including monobasic acids such as acetate or the propionate and especially those with hydroxy organic acids and polybasic acids, such as the citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid-addition and quaternary ammonium salts are the full equivalents of the bases from which they are derived.

The tangible embodiments of this invention, either as free bases or in the form of non-toxic pharmaceutically acceptacle acid-addition or quaternary ammonium salts can be combine with conventional pharmaceutical diluents and carriers in accordance with techniques well known in the art of pharmaceutical chemistry to form such dosage forms as tablets, suspensions, solutions, suppositories and the like which are adapted to administration by conventional means.

The best mode contemplated by the inventors for carrying out the invention will now be set forth as follows:

EXAMPLE 1

(a) 3-p-hydroxyphenyl)-2-phenyl-5,6,7,8,tetrahydro-naphtho[2,3-b]furan

A solution of 5,6,7,8,-tetrahydro-2-naphthol (4.44 g., 0.03 mole) and 4-benzyloxybenzoin (10.38 g., 0.03 mole) in peroxide-free dioxane (100 ml.) and concentrated hydrochloric acid (30 ml.) was heated under reflux. After six and twelve hours further aliquots of concentrated hydrochloric acid (10 ml. each) were added and the contents refluxed for a total of 72 hours. The reaction mixture was cooled, diluted with water (1000 ml.) and extracted with ether (3 x 100 ml.). The ether extract was washed successively with aqueous sodium hydroxide (3%) and water; dried over anhydrous sodium sulphate and the solvent removed. The residue was crystallized from benzenehexane, M.P. 146° C., yield: 3.2 g.

(b) 2-phenyl-3-[p-pyrrolidinoethoxyphenyl)]-5,6,7,8-tetrahydronaphtho[2,3-b]furan A mixture of 3 - (p-hydroxyphenyl)-2-phenyl-5,6,7,8-tetrahydro-naphtho[2,3-b]furan (1.360 g., 0.004 mole), pyrrolidinoethyl chloride hydrochloride (0.82 g., 0.0048 mole) and anhydrous potassium carbonate (1.0 g.) in dry acetone (25 ml.) was refluxed for 12 hours. The mixture was filtered and the filtrate concentrated under reduced pressure. Residue was taken up in ethyl acetate and extracted with hydrochloric acid (3 N). The acid extract was basified and the free base extracted with ethyl acetate, washed with water and dried over anhydrous $Na_2SO_4$ and converted into its hydrochloride by passing dry hydrochloric acid gas through its solution. The residue left after the removal of solvent was crystallized from ethanol-dry ether, M.P. 228–29° C. yield 1.2 g.

In like manner also were prepared:

EXAMPLE 2

2 - phenyl-3-[p-(2-pyrrolidinoethoxyphenyl)]-6,7-dihydro-5H-indeno[5,6-b]furan, M.P. 307° C. was prepared from 3 - (p-hydroxyphenyl)-2-phenyl-6,7-dihydro-5H-indeno[5,6-b)]furan, M.P. 184° C.

EXAMPLE 3

2 - phenyl - 3-[p-(2-pyrrolidinoethoxyphenyl)]-6,7,8,9-tetrahydro-5H - cycloheptal[f]benzofuran, M.P. 251° C., from 3 - (p-hydroxyphenyl)-2-phenyl-6,7,8,9-tetrahydro-5H-cyclohepta[f]-benzofuran, M.P. 158° C.

The subject matter which the applicants regard as their invention is particularly pointed out and distinctly claimed as follows:

1. 2 - phenyl - 3-[p-(2-pyrrolidinoethoxyphenyl)]-6,7-dihydro-5H-indeno[5,6-b]furan.
2. 2 - phenyl - 3-[p-(2-pyrrolidinoethoxyphenyl)]-5,6,7,8-tetahydro-naphtho[2,3-b]furan.
3. 2 - phenyl - 3-[p-(2-pyrrolidinoethoxyphenyl)]-6,7,8,9-tetrahydro-5H-cyclohepta[f]benzofuran.

References Cited

UNITED STATES PATENTS 3,394,125   7/1968   Crenshaw _____ 260—326.5

ALEX MAZEL, Primary Examiner

J. A. NARCAVAGE, Assistant Examiner

U.S. Cl. X.R.

260—247.2, 247.7, 268, 294, 294.7, 326.3, 346.2